United States Patent
Geneys et al.

(10) Patent No.: US 7,390,400 B2
(45) Date of Patent: Jun. 24, 2008

(54) DENITRIFICATION REACTOR WITH A FIXED CULTURE

(75) Inventors: Cédric Geneys, Saint Germain-en-Laye (FR); François Virloget, Saint Priest (FR)

(73) Assignee: Suez Environnement, Paris (FR)

( * ) Notice: Subject to any disclaimer, the term of this patent is extended or adjusted under 35 U.S.C. 154(b) by 59 days.

(21) Appl. No.: 10/566,278

(22) PCT Filed: Jul. 27, 2004

(86) PCT No.: PCT/FR2004/002011

§ 371 (c)(1),
(2), (4) Date: Apr. 4, 2006

(87) PCT Pub. No.: WO2005/014493

PCT Pub. Date: Feb. 17, 2005

(65) Prior Publication Data

US 2006/0186027 A1    Aug. 24, 2006

(30) Foreign Application Priority Data

Aug. 1, 2003   (FR) .................................. 03 09558

(51) Int. Cl.
*C02F 3/06* (2006.01)
(52) U.S. Cl. .................... 210/150; 210/195.1; 210/253; 210/903
(58) Field of Classification Search ................. 210/150, 210/151, 195.1, 253, 605, 615, 617, 630, 210/903
See application file for complete search history.

(56) References Cited

U.S. PATENT DOCUMENTS

| 3,770,623 | A | * | 11/1973 | Seidel ........................ 210/253 |
| 4,251,359 | A | * | 2/1981 | Colwell et al. .............. 210/151 |
| 4,892,658 | A | * | 1/1990 | Martin et al. ................ 210/617 |
| 5,137,636 | A | * | 8/1992 | Bundgaard .................. 210/903 |
| 5,156,742 | A | * | 10/1992 | Struewing .................... 210/151 |

(Continued)

FOREIGN PATENT DOCUMENTS

| AU | 754195 | * | 3/2000 |
| EP | 0 524 794 A | | 1/1993 |
| JP | 06 114388 A | | 7/1994 |

*Primary Examiner*—Christopher Upton
(74) *Attorney, Agent, or Firm*—Connolly Bove Lodge & Hutz LLP

(57) ABSTRACT

A denitrification reactor with a culture fixed to an organized plastic-type support is combined with an installation for the nitrification and elimination of the carbon-based pollution The reactor is supplied with a mixture of the raw effluent to be treated and of the effluent originating from the installation for the nitrification and elimination of the carbon-based pollution. The reactor includes two denitrification compartments (3, 4) arranged in parallel and operating altenatingly between a filling phase (denitrification and self cleaning-out of the excess biomass); and an emptying phase (denitrification and drainage of the excess biomass). A system for supplying the mixture of effluents consisting of a rotary arm (11) which alternately supplies the mixture to each of the compartments.

8 Claims, 4 Drawing Sheets

U.S. PATENT DOCUMENTS

| | | | |
|---|---|---|---|
| 5,342,523 A * | 8/1994 | Kuwashima | 210/253 |
| 5,352,357 A * | 10/1994 | Perry | 210/150 |
| 5,531,894 A * | 7/1996 | Ball et al. | 210/605 |
| 5,624,563 A * | 4/1997 | Hawkins | 210/253 |
| 5,795,481 A | 8/1998 | Lesouef | |
| 6,238,563 B1 * | 5/2001 | Carroll et al. | 210/151 |
| 2004/0222150 A1 * | 11/2004 | Hong et al. | 210/903 |
| 2007/0062868 A1 * | 3/2007 | Bonazza et al. | 210/903 |

* cited by examiner

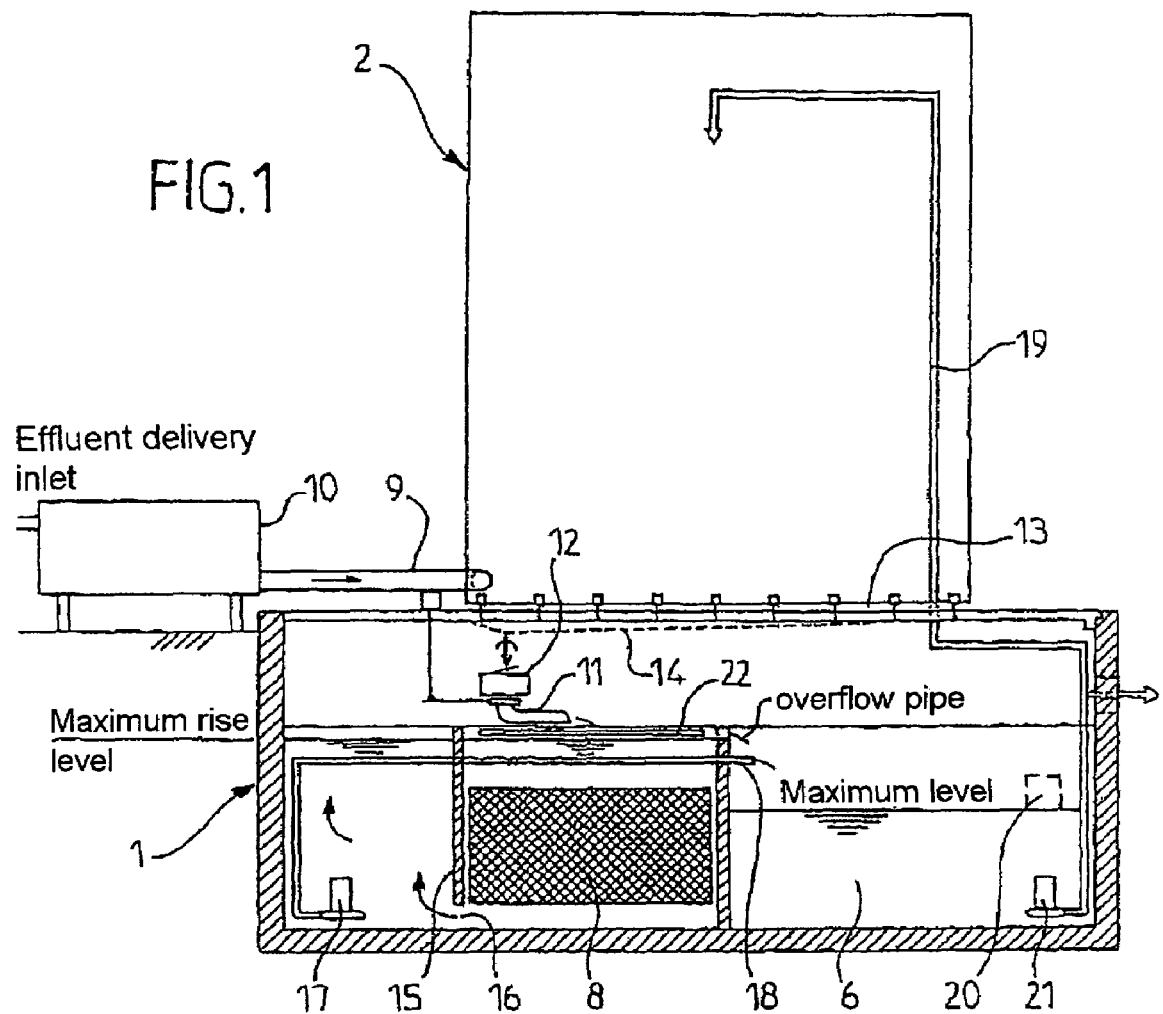
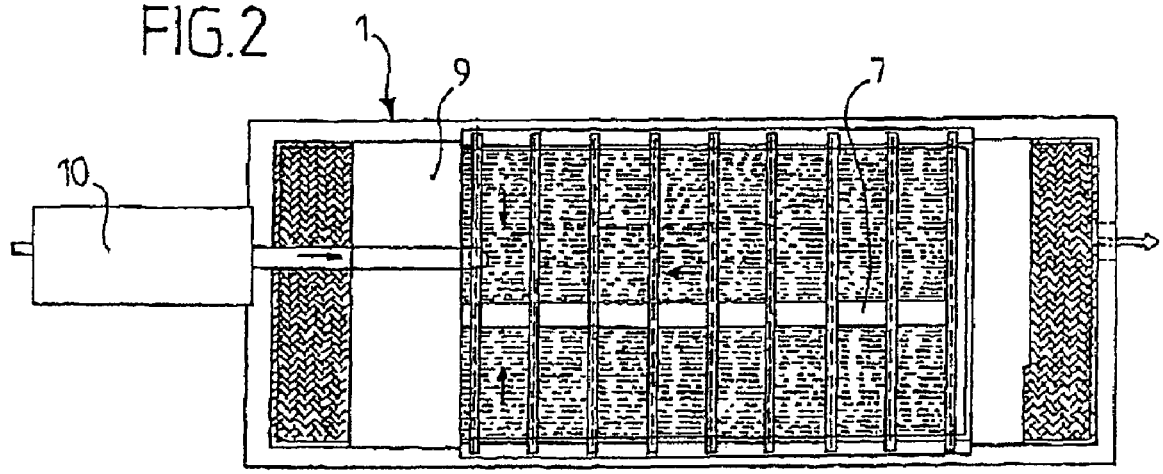

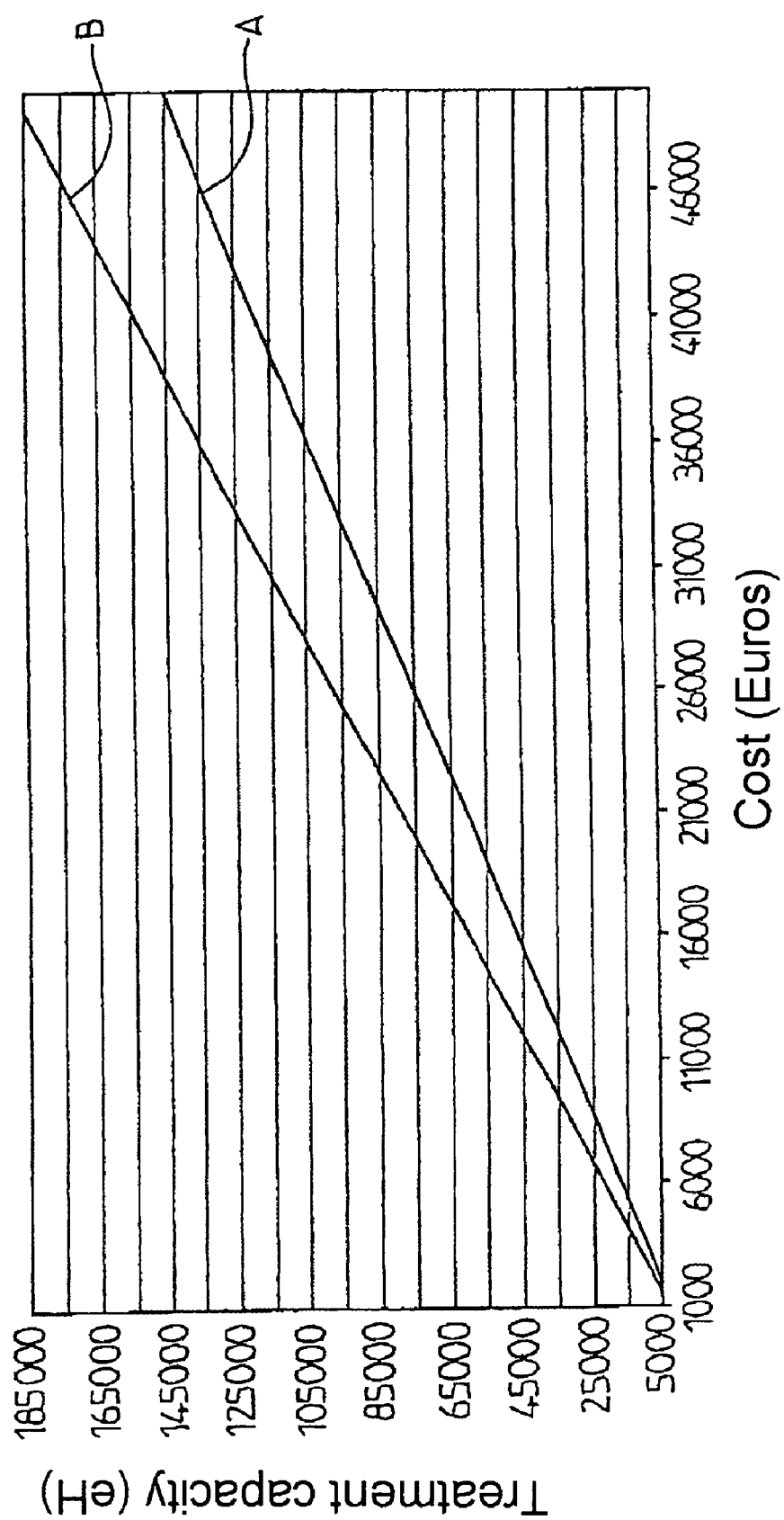

DENITRIFICATION REACTOR WITH A FIXED CULTURE

FIELD OF THE INVENTION

The present invention relates to a denitrification reactor with a fixed culture, combined with an installation for the nitrification and elimination of the carbon-based pollution.

BACKGROUND OF THE INVENTION

It is known that the treatment of nitrogen in waste-water is carried out in two steps:
- a nitrification step during which the oxidation of the ammoniacal nitrogen, present in the effluent, to nitrite and then to nitrate is carried out by means of a biochemical reaction due to the action of autotrophic bacteria, and
- a denitrification step during which the nitrate nitrogen is reduced to a lower oxidation state by means of a biochemical reaction using heterotrophic bacteria.

Each of these two steps requires a certain number of conditions to be observed:
- the nitrification step requires: a high sludge age, since the autotrophic biomass has a slow growth rate; a pH of between 6 and 8 with an optimal value of the order of 7, given that the growth rate of nitrifying bacteria decreases outside these pH values, and a dissolved oxygen content maintained at between 2 and 4 mg/l;
- the denitrification step requires the following constraints to be observed: a low sludge age, given that the heterotrophic biomass exhibits rapid growth; a pH of between 6 and 8, with an optimal value of the order of 7; a very low dissolved oxygen content (anoxic conditions), given that the presence of oxygen inhibits denitrification, and a $BOD_5$ sufficient to satisfy the organic carbon needs.

It results from these constraints that the nitrification and denitrifications phenomena are entirely contradictory. It is the reason for which constructors of wastewater treatment plants have based their technique on spatial and/or temporal alternation of the aeration (nitrification) and anoxic (denitrification) phases.

It is known, moreover, that the denitrification rate depends on two essential parameters: firstly, the temperature, and secondly, the organic carbon available in the biological sludge, and therefore on the amounts of organic carbon provided by the effluent to be treated (at 15° C., the values are close to 2.5. to 3 g $N-NO_3$/kg VSS/h).

At the current time, the denitrification process can be carried out in three different ways:
- in an anoxia zone in free culture. The anoxic tank is located at the head of the treatment system and it is responsible for the denitrification. The supply of $NO_3^-$ is provided by recirculation of the mixed liquor originating from the aeration tank, and the organic carbon needs are satisfied by the inlet of pretreated water. The denitrifying biomass is recirculated from the clarifier to the anoxic tank. The aeration tank ensures the nitrification and the additional elimination of the carbon-based pollution. The drawback of this configuration comes from the fact that it requires a recirculation of the order of 150 to 400% of the raw water flow in order to recycle the nitrates to be eliminated and so as to observe a sufficient C/N ratio. In general, the volume of the anoxic tank represents 25% of the total volume required for purification;
- in the aeration-syncopating aeration tank, temporal alternation allows nitrification-denitrification in a single tank. In this case, the following optimum conditions should be observed: a sludge age of more than 10 days; a 30% increase in the aeration compared with the requirements of only elimination of the carbon-based pollution; a minimum anoxia time of the order of 8 to 10 h/day, and a sludge content of approximately 4 g VSS/l;
- in a fixed-biomass installation (biofilter) which, in the same way as an anoxia zone, can make it possible to provide denitrification on the condition that air is injected in order to guarantee a homogeneous and controlled detachment of the excess biomass.

BRIEF DESCRIPTION OF THE INVENTION

Starting from this state of the art, the present invention proposes to provide a denitrification reactor which solves in particular the following technical problems that are not solved by this state of the art:
- elimination of the need to ensure self-cleaning-out of the excess biomass via an injection of air, and therefore to provide aeration systems;
- reduction of the volume of the installation dedicated to denitrification, and
- control of the contact time required for denitrification.

Consequently, a subject of this invention is a denitrification reactor with a culture fixed to an organized plastic-type support, combined with an installation for the nitrification and elimination of the carbon-based pollution, said reactor being supplied with a mixture of the raw effluent to be treated and of the effluent originating from the installation for the nitrification and elimination of the carbon-based pollution, characterized in that it comprises:
- two denitrification compartments provided with an organized plastic-type lining, these compartments, arranged in parallel, operating via successive, i.e. alternating, loads or sections, one being in the filling phase (denitrification and self-cleaning-out of the excess biomass, i.e. detachment of this excess biomass by the action of hydraulic shear forces) while the other is in the emptying phase (denitrification and drainage of the excess biomass, i.e. evacuation of the excess biomass detached during the self-cleaning-out);
- a drainage compartment for receiving the denitrified effluent from one or other of said denitrification compartments;
- a system for supplying the mixture of effluents consisting of a rotary arm which alternately supplies, at the surface, each of said compartments; and
- means for ensuring the recirculation of the denitrified effluent from the drainage compartment to the installation for the nitrification and elimination of the carbon-based pollution.

According to the present invention, the installation for the nitrification and elimination of the carbon-based pollution can be a bacterial bed or surface irrigation bed; a system of aerobic biological filtration in ascending air and water flow of the type "Biofor®" or biological disks to which the biomass attaches, these disks revolving around a horizontal axis and being partly immersed in the effluent to be treated.

According to one embodiment of the present invention, the denitrification reactor described above can be integrated into an installation as described in FR-B-2 782 508, the effluent denitrified in said reactor being recirculated in the bacterial bed of this installation. By virtue of this arrangement, the finishing of the treatment and in particular the elimination of the suspended solids takes place in the filters planted with reeds described in that French patent.

Other characteristics and advantages of the present invention will emerge from the description given hereinafter, with reference to the attached drawings which illustrate an example of implementation thereof, that is in no way limiting in nature. Regarding the drawings:

BRIEF DESCRIPTION OF THE DRAWINGS

FIG. 1 is a view of a section along I-I of FIG. 4;
FIG. 2 is a view from above of FIG. 1;
FIG. 6 represents a curve illustrating the economic advantages provided by the present invention.

DETAILED DESCRIPTION OF THE INVENTION

Figure 4:
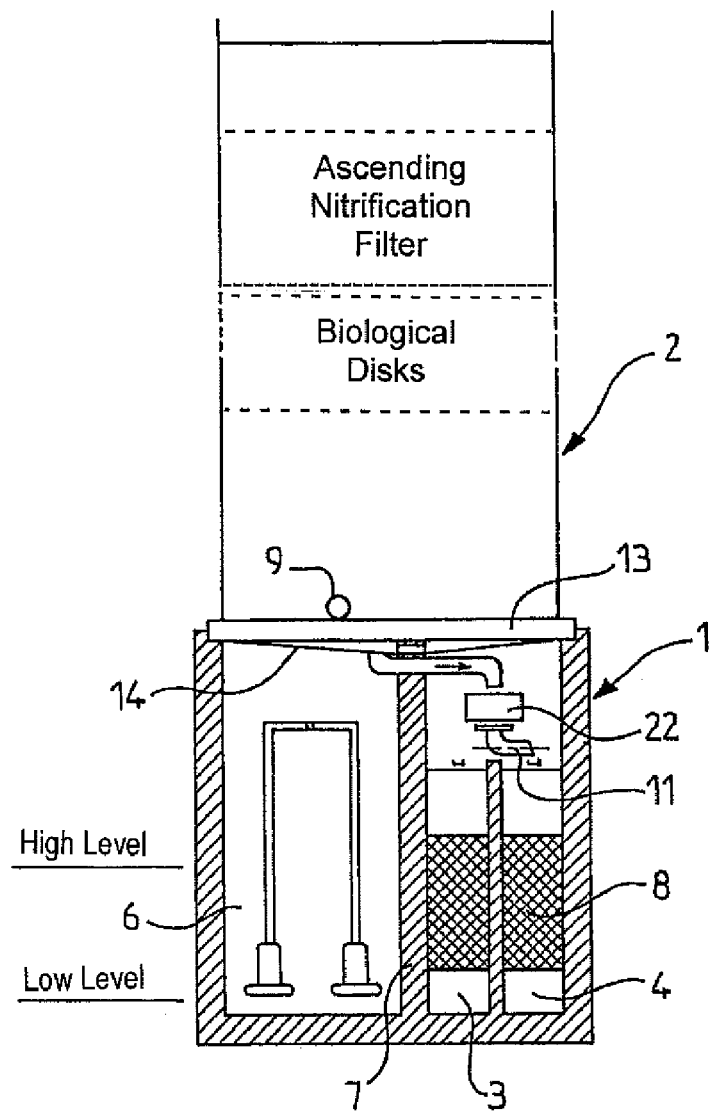
FIG. 4 is a view of a section along IV-IV of FIG. 3.

As is seen on the drawings, the denitrification reactor which is the subject of the present invention, denoted in its entirety by reference 1, is combined with an installation in which the denitrification of the effluent and the elimination of the carbon-based pollution are carried out, this installation having been represented diagrammatically on the drawing and denoted by reference 2. It may in particular be a bacterial bed or surface irrigation bed, a system of aerobic biological filtration in ascending air and water flow of the type "Biofor®" or biological disks to which the biomass attaches, these disks revolving around a horizontal axis and being partly immersed in the effluent to be treated.

The denitrification reactor comprises, firstly, two compartments 3 and 4, in parallel, for the denitrification and separated by a partition 5 and, secondly, a "drainage" compartment 6 that is completely isolated from the compartments 3 and 4 by a longitudinal partition 7.

Figure 3:
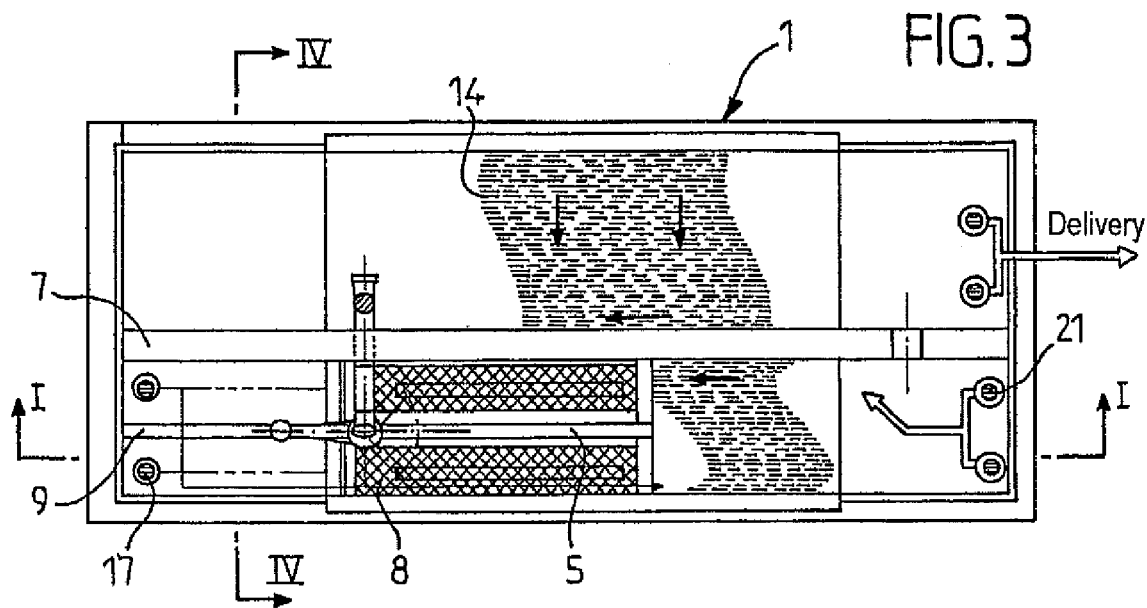
FIG. 3 is a plan view of FIG. 1.
Figure 5:
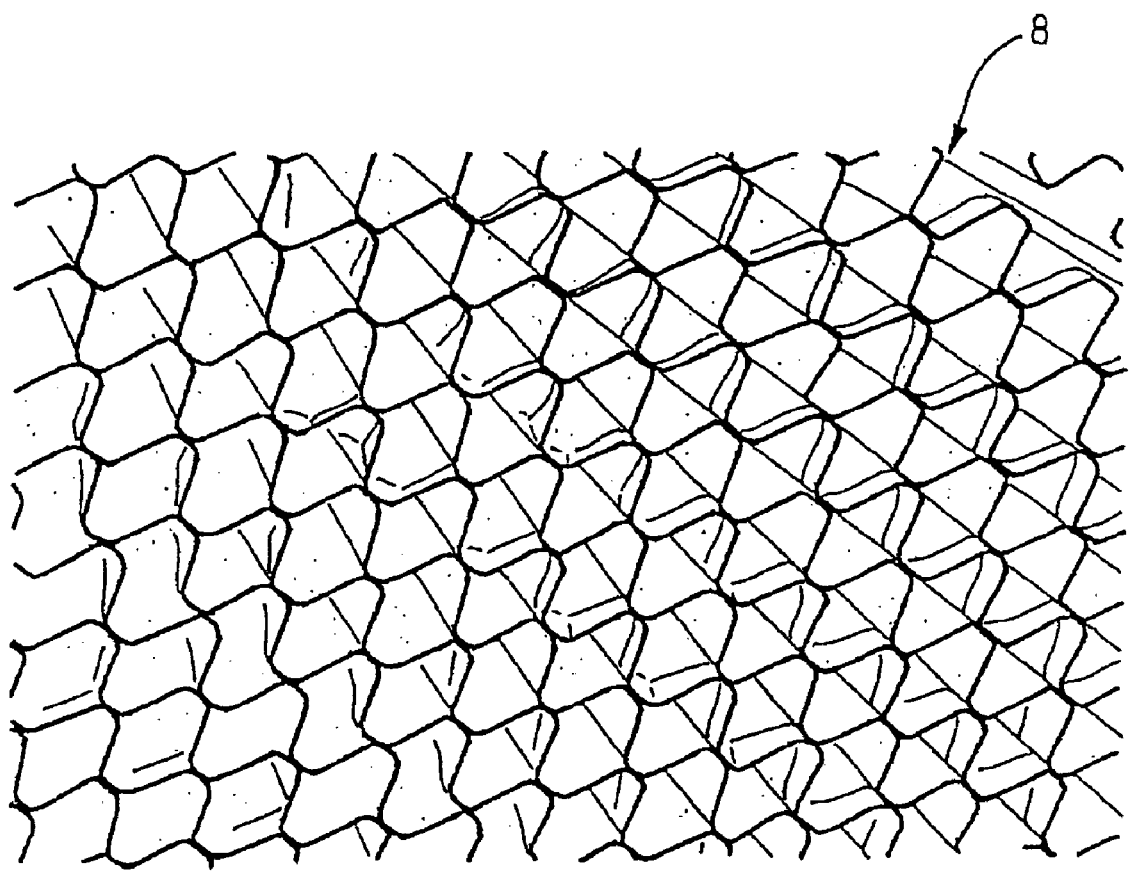
FIG. 5 is a plan view of an example of plastic lining serving as a support for the fixed biomass ensuring denitrification.

The denitrification compartments 3 and 4 are of the type with a culture fixed to an organized plastic-type support shown diagrammatically in FIGS. 1, 3 and 4 by the lining 8. This lining may be of the type illustrated in FIG. 5, exhibiting a specific surface area of between 50 and 200 $m^2/m^3$, and preferably of 150 $m^2/m^3$, for example sold under the brand "Cloisonyl" by the French company ATOCHEM and distributed by CECA, or alternatively other equivalent products, in particular "Biodec®" manufactured by Munters Euroform GmbH and distributed by Socrematic SA.

As will be described hereinafter, the denitrification reactor 1 operates by alternating successive loads or sections on the two compartments 3 and 4 arranged in parallel, in the following way:
reactor filling phase: denitrification and self-cleaning-out;
reactor emptying phase: denitrification and drainage of the excess biomass.

The reactor 1 is supplied with a mixture of the raw effluent delivered via a pipe 9 and originating, for example, from a screening unit 10, this raw effluent being highly loaded with organic materials, and of the effluent originating from the nitrification installation 2. This alternating surface-supplying of compartments 3 and 4 is carried out by means of a rotary arm 11 and a directional control valve 22 using a distribution means 12 receiving the mixture. As is seen on the drawing, the installation 2 for the nitrification and elimination of the carbon-based pollution comprises a floor 13 with means for taking up again the nitrified effluent, which is mixed on a deflector 14 with the raw effluent originating from the pipe 9, before supplying the distribution means 12.

One of the partitions (15 in FIG. 1) delimiting the denitrification compartments 3 and 4 is designed so as to leave a free passage 16 above the floor of the reactor 1, for the circulation of the effluent treated in one or other of compartments 3 and 4. Drainage pumps 17 ensure the re-uptake of this effluent, respectively from compartments 3 and 4, and the evacuation thereof via a pipe 18 into the drainage compartment 6. The majority of the treated effluent admitted into the drainage compartment 6 is recirculated to the installation 2 by means of pumps such as 21 supplying an evacuation pipe represented diagrammatically as 19. The effluent treated, after elimination of the nitrogenous and carbon-based pollutions, is evacuated via a liquid overflow 20.

As is understood from the above description, one of the originalities of the denitrification reactor that is the subject of the invention is the presence of two denitrification compartments arranged in parallel and operating alternately. One operating example is as follows:
t=0 min: supply of compartment 3 of the reactor, compartment 4 at rest,
t=30 min: end of supply and beginning of drainage of compartment 3 into compartment 6, and supply of compartment 4,
t=60 min: end of drainage and beginning of supply of compartment 3; end of supply and beginning of drainage of compartment 4,
t=90 min: end of supply and beginning of drainage of compartment 4; end of drainage and beginning of supply of compartment 4,
t=120 min: etc.

As was mentioned above, the majority of the effluent treated in the denitrification reactor 1 is recirculated to the installation 2 for the nitrification and elimination of the carbon-based pollution. The recirculation rate is of the order of 300%.

The proportioning of the volumes of the denitrification reactor 1 takes into account the time at peak flow rates and also the maximum flow rate acceptable by the plant. It is possible, without departing from the scope of the invention, to envision a buffer tank in order to smooth out the flow rates and loads.

The advantages provided by the present invention are in particular as follows:

A) Controlled Amount of Time Spent Immersed:

The fact of operating by means of alternating loads in compartments 3 and 4 makes it possible to apply and control the contact time necessary for denitrification. The reactor may, for example, be of a size so as to ensure an average contact time of the effluent of the order of 30 minutes.

B) Control of the Biomass

It was noted, with surprise, that the fact of operating by means of alternating loads makes it possible to ensure self-cleaning-out of compartments 3 and 4 of the reactor during the supply and drainage thereof. Thus, by virtue of the invention, the detachment of the excess biomass is only carried out, naturally, by the irrigation force, as in a conventional bacterial bed. In fact, it is not necessary to ensure self-cleaning-out of the excess biomass by supplying air in the form of fine bubbles. The invention makes it possible to do away with the use of noisy aeration systems that generate polluted aerosols, and for which the cost price and the running and maintenance costs are high.

C) Reduction of the Volume of the Installation for Denitrification

The invention makes it possible to considerably reduce the volume of the installation (compartments 3 and 4) for the denitrification process. This is because the volume of compartments 3 and 4 represents only 10% of the total volume necessary for the treatment, whereas the activated sludge anoxic volume generally corresponds to 25% of this total volume.

The reactor that is the subject of the present invention can be applied in particular to wastewater treatment plants whose total nitrogen elimination level is NGL<15 mg/l (regulations in force for plants treating less than 100 000 inhabitant equivalents).

FIG. 6 illustrates the differences in cost as a function of the treatment capacity, between a conventional installation (line A) and an installation according to the invention (line B).

The invention can also be applied to the restoring of a plant with a view to a required level of treatment that is more restrictive (total nitrogen elimination) than when the purification plant was constructed. In this context, the invention is of most particular advantage in the case of the restoring or the construction of plants with a treatment capacity of less than 5000 inhabitant equivalents, for which total nitrogen elimination is required. In fact, in this type of installation, processes described as "rustic", i.e. having low running costs (workforce, consumption of electricity, minimum amount of electromechanical equipment, etc.), are generally used.

The invention can thus be applied to installations of the type described in FR-B-2 782 508, which describes a process and an installation for treating domestic wastewater combining a bacterial bed followed by cells or beds for filtration-composting planted with reeds (referred to as "rhizofilter").

In this type of installation, the first stage consisting of the bacterial bed (or of biological disks) ensures the treatment of the dissolved and colloidal carbon-based material (COD, $BOD_5$ and $NNH_4$) and the second stage consisting of the filtration-composting beds refines and completes the treatment of the dissolved material, while at the same time filtering the particulate materials present (initial suspended solids+washed biomass originating from the bacterial bed or from the biological disks). The sludge is thus stored under aerobic conditions for 5 to 8 years. As a result, it undergoes aerobic digestion, which results in a degree of mineralization of greater than 40% and therefore a reduction of approximately 30% in the mass of sludge initially produced.

In this particular application, the effluent treated by means of the denitrification reactor described above is pumped and supplied, via sections the recirculation station of the bacterial bed. The filtration-composting beds planted with reeds, on which the finishing treatment is carried out, are fed from an overflow pipe that is located in the recirculation station.

It should be clearly understood that the proportioning of the volumes of installations takes into account the time peak flow rate and also the maximum flow rate acceptable by the plant. As was mentioned above, a buffering tank can be envisioned in order to smooth out the flow rates and the loads.

This configuration specific to the invention brings about only a 10% increase compared with the cost of an installation according to Australian patent AU 754195 corresponding to French Patent FR-B-2 782 508 designed simply to eliminate carbon and ammoniacal nitrogen (nitrification). The implementation of the invention, in this specific application, is extremely simple, even in the case of the restoring or extension of installations in particular with a view to an increase in their treatment capacity.

In the table below, the results obtained, respectively, using an installation according to Australian patent AU 754195, corresponding to FR-B-2 782 508 (installation A) and a purification plant (installation B) in which the invention is applied to installation A were compared.

| | INSTALLATION A | INSTALLATION B |
|---|---|---|
| TREATMENT CAPACITY | | |
| Population | 1000 eH | 1000 eH |
| Daily flow rate | 150 m³/d | 150 m³/d |
| Average flow rate | 6.25 m³/h | 6.25 m³/h |
| $BOD_5$ | 60 kg/d | 60 kg/d |
| COD | 105 kg/d | 105 kg/d |
| TSS | 90 kg/d | 90 kg/d |
| TKN | 11 kg/d | 11 kg/d |
| LEVEL OF WASTE | | |
| $BOD_5$ | 35 mg/l | 35 mg/l |
| COD | 125 mg/l | 125 mg/l |
| TSS | 25 mg/l | 25 mg/l |
| TKN | 5 mg/l | |
| NGL | | 15 mg/l |
| CHARACTERISTICS OF THE INSTALLATIONS BACTERIAL BED | | |
| Volume | 112 m³ | 112 m³ |
| Surface | 24 m² | 24 m² |
| RECIRCULATION | | |
| Volume | 20 m³ | 20 m³ |
| Flow rate | 60 m³/h | 60 m³/h |
| RECEPTION RAW WATER | | |
| Volume | 40 m³ | |
| DENITRIFICATION REACTOR | | |
| Number | 0 | 2 |
| Unit volume | | 6 m³ |
| Unit volume of plastic lining (150 m²/m³) | | 5 m³ |
| REACTOR DRAINAGE | | |
| Unit volume | | 17 m³ |
| Flow rate | | 35 m³/h |
| SUPPLY OF REED BEDS | | |
| Volume | 22 m³ | 22 m³ |
| Flow rate | 90 m³/h | 90 m³/h |
| REED BED | | |
| Total surface | 450 m² | 450 m² |

It remains, of course, that the present invention is not limited to the examples of implementation or of application described and/or mentioned above, but that it encompasses all the variants thereof.

The invention claimed is:

1. A denitrification reactor with a culture fixed to an organized plastic-type support, combined with an installation for the nitrification and elimination of the carbon-based pollution, said reactor being supplied with a mixture of the raw effluent to be treated and of the effluent originating from the installation for the nitrification and elimination of the carbon-based pollution, characterized in that it comprises:

two denitrification compartments (3,4) provided with an organized plastic-type lining (8), these compartments, arranged in parallel, and having a means for supplying the mixture of effluents comprising a rotary arm which alternately supplies said effluents at the surface of each of said compartments such that one is in the filling phase (denitrification and self cleaning-out of the excess biomass) while the other is in the emptying phase (denitrification and drainage of the excess biomass);

a drainage compartment (6) for receiving the denitrified effluent originating from one or other of said denitrification compartments; and means (19,21) for recirculating the denitrified effluent from the drainage compartment (6) to the installation (2) for the nitrification and elimination of the carbon-based pollution.

2. The reactor as claimed in claim 1, wherein the installation (2) for the nitrification and elimination of the carbon-based pollution is a bacterial bed or surface irrigation bed.

3. The reactor as claimed in claim 1, wherein the installation (2) of the nitrification and elimination of the carbon-based pollution is a system of aerobic biological filtration in ascending air and water flow.

4. The reactor as claimed in claim 1, wherein the installation (2) for the nitrification and elimination of the carbon-based pollution comprising biological disks to which the biomass is attached, these disks revolving around a horizontal axis and being partly immersed in the effluent to be treated.

5. The reactor as claimed in claim 1, wherein the lining (8) exhibits a specific surface area of between 50 and 200 $m^2/m^3$.

6. The reactor as claimed in claim 5, wherein the specific surface area is 150 $m^2/m^3$.

7. The reactor as claimed in claim 1, wherein the supply of the raw effluent by means of said rotary arm (11) is carried out using a distribution means (12) receiving the mixture of effluents from a deflector (14) provided under re-uptake means in the floor (13) of the installation (2).

8. The reactor as claimed in claim 1, wherein the rate of recirculation, to the installation (2), of the effluent treated in said reactor is of the order of 300%.

* * * * *